H. Doolittle,
Fingered Scoop.
No. 87,553.  Patented Mar. 9, 1869.
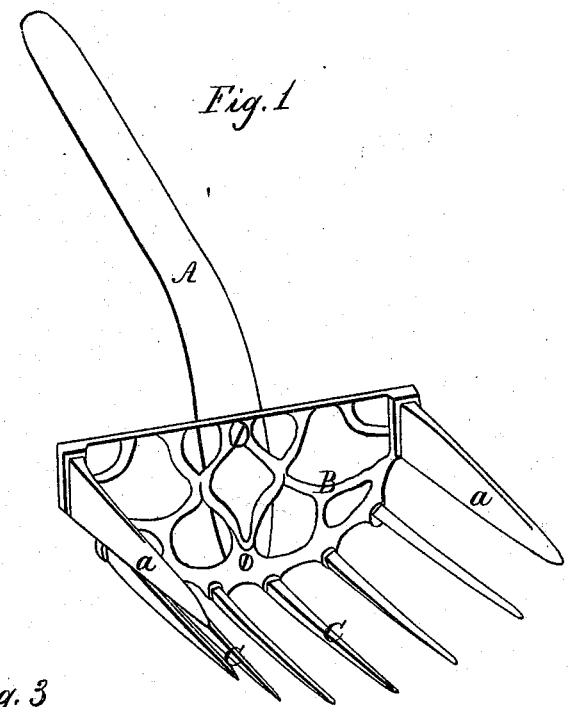
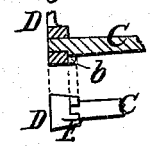
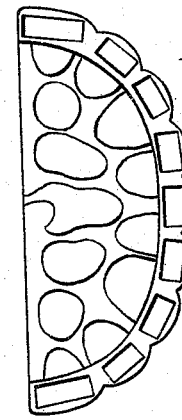
Witnesses
Geo. W. Tibbits
Geo. Hester
Inventor
Harrison Doolittle

HARRISON DOOLITTLE, OF EAST CLEVELAND, OHIO.

Letters Patent No. 87,553, dated March 9, 1869.

IMPROVEMENT IN FINGERED SCOOP.

The Schedule referred to in these Letters Patent and making part of the same.

*To all whom it may concern:*

Be it known that I, HARRISON DOOLITTLE, of East Cleveland, in the county of Cuyahoga, and State of Ohio, have invented certain new and useful Improvements in a Fingered Scoop; and I do hereby declare that the following is a full and complete description of the construction of the same, reference being had to the accompanying drawings, making a part of this specification, in which—

Figure 1 is a perspective view.

Figures 2 and 3 will be referred to in the description.

Like letters of reference refer to like parts in the views.

The nature of this invention relates to the construction of a scoop, having tines or fingers, for gathering potatoes after they have been dug from the ground, the space between the tines enabling the dirt to be sifted through.

This scoop is also adapted to gathering other vegetables as well as potatoes. It may also be used (being made smaller) for weeding between rows of plants, the dirt being easily shook through between the tines, the weeds being retained in the scoop, and removed to an out-of-the-way place.

In the drawing—

A represents the handle of the scoop, to one end of which is secured the plate B, forming the head of the scoop.

C C are fingers secured round the outer edge of said head, as shown, the larger fingers *a a* being secured, one at each end of the plate.

These fingers are secured in the plate in the following manner, a sectional view of which is shown in fig. 3.

C represents the finger, and

D, a portion of the plate, which is enlarged or forms an ear, through which the end of the finger passes, the said finger being provided with a shoulder, *b*, which comes against the plate, holding and securing the said finger in place, forming a sort of dovetail-joint, shown at E, fig. 3.

Fig. 2 is another form of the plate B, which is made, the outer edge being provided with openings for the fingers, which may be made of wood.

The scoop may be constructed so that every alternate finger may be removed and the scoop used for sorting potatoes, the small ones dropping through between the fingers.

This scoop is very useful and convenient in gathering potatoes, as a large quantity can be taken up at once, and the dirt will fall and sift through between the fingers.

This scoop is also convenient for lifting or gathering vegetables or fruits, and may also be made small enough to be used in gardening, for weeding, transplanting, &c., being a very durable, simple, but most convenient article, for the purpose described.

What I claim as my improvement, and desire to secure by Letters Patent, is—

The perforated plate B, having the notched lugs D at the lower edge, near the holes, for securing the fingers C in position, as shown, and the fingers C, in combination, as a new mode of constructing a scoop, for the purposes described.

HARRISON DOOLITTLE.

Witnesses:
 GEO. W. TIBBITTS,
 GEO. HESTER.